United States Patent
Komaki

(10) Patent No.: US 7,038,769 B2
(45) Date of Patent: May 2, 2006

(54) CHARACTERISTIC MONITORING METHOD OF PUMPING LIGHT SOURCE FOR OPTICAL AMPLIFICATION AND OPTICAL AMPLIFIER

(75) Inventor: Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 29 days.

(21) Appl. No.: 10/852,224

(22) Filed: May 25, 2004

(65) Prior Publication Data
US 2005/0128467 A1    Jun. 16, 2005

(30) Foreign Application Priority Data
Dec. 12, 2003    (JP)    ............................. 2003-414922

(51) Int. Cl.
*G01N 21/00*    (2006.01)

(52) U.S. Cl. .................................... 356/73.1

(58) Field of Classification Search ............... 356/73.1; 359/341.41, 341.42, 337.12, 347

See application file for complete search history.

(56) References Cited

U.S. PATENT DOCUMENTS

| 6,747,788 B1 * | 6/2004 | Kinoshita ................... 359/334 |
| 6,831,779 B1 * | 12/2004 | Caplan ....................... 359/347 |
| 6,900,934 B1 * | 5/2005 | Lelic ..................... 359/341.41 |

FOREIGN PATENT DOCUMENTS

| JP | 05-055673 | 3/1993 |
| JP | 08-204267 | 8/1996 |
| JP | 10-209970 | 8/1998 |
| JP | 2002-217836 | 8/2002 |

* cited by examiner

*Primary Examiner*—Tu T. Nguyen
(74) *Attorney, Agent, or Firm*—Staas & Halsey LLP

(57) ABSTRACT

A monitoring method is realized which is capable of detecting the optical power characteristic of a pumping light source with high accuracy at the operation time of an optical amplifier, wherein the optical amplifier is capable of performing a pumping light control without affecting a signal light in the operation even when the number of signal light wavelengths is abruptly changed. To this end, a drive signal for the pumping light source is modulated at a frequency higher than a cut-off frequency of an EDF, and the power of a pumping light output form the pumping light source driven by the drive signal is measured so as to correspond to a drive condition of the pumping light source, to calculate a slope of an I-L characteristic of the pumping light source, which is used to correct a proportional factor of an AGC circuit.

7 Claims, 7 Drawing Sheets

CHARACTERISTIC MONITORING METHOD OF PUMPING LIGHT SOURCE FOR OPTICAL AMPLIFICATION AND OPTICAL AMPLIFIER

BACKGROUND OF THE INVENTION

1. Field of the Invention

The present invention relates to a characteristic monitoring method of a pumping light source for optical amplification for when a pumping light is supplied to a rare earth doped fiber to amplify a signal light, and an optical amplifier. In particular, the present invention relates to a technique for monitoring an optical power characteristic of a pumping light source using a semiconductor laser without affecting the amplification of signal light, to reflect the monitoring result in a pumping light control of an optical amplifier.

2. Description of the Related Art

As an optical amplifier for amplifying a wavelength division multiplexed (WDM) light containing a plurality of signal lights having different wavelengths, there has been known an optical amplifier utilizing an optical fiber doped with a rare earth element, for example. This optical amplifier using the rare earth element doped fiber is for supplying a pumping light output from a pumping light source using, for example, a semiconductor laser or the like, to the rare earth element doped fiber, to amplify the WDM light up to a desired level by stimulated emission which occurs when the WDM light is propagated through the rare earth element doped fiber in a pumped state (refer to Japanese Unexamined Patent Publication Nos. 5-55673 and 8-204267).

It has been known that the pumping light source used for the above optical amplifier, is given with a drive signal generated by a drive circuit, to output a pumping light of required power, however, an optical power characteristic of the pumping light source relative to the drive signal is changed due to a temperature variation or the deterioration with time. Particularly, in recent years, a so-called coolerless semiconductor laser in which a temperature adjustment function is omitted, has been utilized as a pumping light source, bringing the reduction of power consumption and the cost reduction into view. In such a case, an influence on the signal light amplification due to a change in the optical power characteristic of the pumping light source becomes large. Accordingly, in order to obtain the WDM light amplified up to the desired level by the optical amplifier, it is needed to control the drive signal according to a change in characteristic of the pumping light source.

For the drive control of the pumping light source in the conventional optical amplifier, there has been proposed a technique in which, on the basis of data for outputting a required pumping light according to the ambient temperature, with a pumping light for when the pumping light source is driven in accordance with the data being a reference value, a pumping light at the operation time and the reference value are compared with each other, to thereby perform the temperature compensation and the compensation for deterioration with time of the pumping light source (refer to Japanese Unexamined Patent Publication No. 2002-217836).

Further, to the optical amplifier using the rare earth element doped fiber as described above, an automatic level control (ALC) controlling a level of output light to be fixed or an automatic gain control (AGC) controlling a gain to be fixed is typically applied (refer to Japanese Unexamined Patent Publication No. 10-209970).

FIG. 8 is a block diagram showing one example of a conventional optical amplifier applied with the AGC. In this optical amplifier, for example, a pumping light output from a pumping light source (LD) 102 is supplied to an erbium doped fiber (EDF) 101 via a multiplexer 103, and a part of a WDM light that is to be input to the EDF 101 is demultiplexed by a demultiplexer 104, to be photo-electrically converted by a light receiving element (PD) 105, so that the input light power is monitored. Also, a part of the WDM light output from the EDF 101 is demultiplexed by a demultiplexer 106, to be photo-electrically converted by a light receiving element (PD) 107, so that the output light power is monitored. Then, the respective monitoring results are sent to an AGC circuit 108 in which an amplification degree in the EDF 101 is calculated, and a drive condition of the pumping light source 102 is controlled according to the calculation result, so that a fixed gain can be obtained. By performing the AGC by such a control circuit, it becomes possible to suppress an occurrence of gain deviation between signal lights having respective wavelengths contained in the WDM light.

In a WDM optical transmission system to which the conventional optical amplifier as described above is applied, there are, for example, the case where the number of wavelengths of signal lights contained in a WDM light is increased with an increase in transmission data, addition of transmission system or the like, or the case where the number of signal light wavelengths is decreased for maintenance or the like. It is required that the operational wavelength is not affected even when the number of signal light wavelengths is increased or decreased. Especially, for example, in a system with the adding/dropping of signal light as shown in FIG. 9, in the case where a fault, such as breakage of transmission path fiber or the like, occurs, there is a possibility that the number of signal light wavelengths is significantly changed, such as, from a maximum n+1 waves to 1 wave. If the number of signal light wavelengths is abruptly changed as described above, in an optical amplifier 100B located downstream the fault occurring point, since the optical amplification is usually performed in a gain saturation region, there occurs a large level variation in the remaining signal light, in the AGC at a low speed.

Here, the description will be made on a transient response phenomenon of an optical amplifier, which occurs due to a change in the number of signal light wavelengths. Note, a transient response means a transient progress exhibited after a response is generated due to an input given to a control system until the response reaches in a new steady state. In an example in which a pumping light control cannot promptly cope with the change in the wavelength number of WDM light input to the optical amplifier (the level change in input signal light), the transient response described above appears as an optical surge to cause a transmission error.

For example, when a fault, such as transmission path fiber breakage or the like, occurs in the system shown in FIG. 9, and the transmission of signal lights having wavelengths $\lambda_1$ to $\lambda_n$ is interrupted, it is required that the transmission error does not occur in the signal light having wavelength $\lambda_{n+1}$ to be added subsequently, even if the signal lights having wavelengths $\lambda_1$ to $\lambda_n$ are not input to the optical amplifier. In order to satisfy this requirement, in the optical amplifier, it is necessary to immediately reduce the power of pumping light from the power corresponding to n+1 waves to the power corresponding to 1 wave, to amplify the signal light having wavelength $\lambda_{n+1}$ with a pumping light corresponding to 1 wave.

However, since the following capability of the conventional AGC at the time when the number of signal light wavelengths is changed, as shown in FIG. 10 for example, although only the signal light of 1 wave is input, a period of time becomes longer during which the pumping light equivalent to n+1 waves is given to the rare earth element doped fiber, resulting in that the gain is abruptly varied, and the remaining light at a high level (optical surge) is generated instantaneously from the output of the optical amplifier. This optical surge is transmitted to cause the transmission error, and in a system in which the optical amplifiers are connected in multi-stages, the optical surges are accumulated and are amplified. Therefore, there is a possibility that the receiver is damaged. In order to solve such a problem, it is required to apply a high speed AGC, which does not substantially change an inside state (population inversion) of the rare earth element doped fiber.

Further, for the following capability of the AGC at the time when the number of signal light wavelengths is changed, it becomes important that a proportional factor of the control circuit is optimized according to the optical power characteristic of the pumping light source. Namely, for example, when the cooler-less semiconductor laser is utilized as the pumping light source as described above, the optical power characteristic (I-L characteristic) of the semiconductor laser relative to the drive current is significantly changed due to a variation of ambient temperature. To be specific, as shown in an I-L characteristic exemplified in FIG. 11, a slope (slope efficiency) of the I-L characteristic for when the drive current exceeding an oscillation threshold is given to the semiconductor laser, is changed by 1.5 times due to the temperature variation. The fact that the slope of the I-L characteristic of the semiconductor laser is changed by 1.5 times means that the proportional factor of the AGC circuit is changed by 1.5 times, which affects the following capability of the AGC at the time when the number of signal light wavelengths is abruptly changed as described above.

Specifically, FIG. 12 exemplarily shows how the differences show in a level variation of the remaining signal light having 1 wave in the case where the proportional factor of the AGC circuit is changed, when there occurs the change in the number of signal light wavelengths as shown in FIG. 10. A transverse axis of FIG. 12 indicates a period of time during which the total input power to the optical amplifier is reduced from 90% to 10%, namely, a speed of the change in the number of signal light wavelengths. A vertical axis of FIG. 12 indicates a variation amount of the peak power of the remaining signal light having 1 wave. Here, with the proportional factor of a typical AGC circuit being a reference (one time), the proportional factor is reduced to $2/3$ times. In other words, the comparison is performed on the level variation for when the slope of the I-L characteristic of the pumping light source is changed by $2/3$ times. As shown in FIG. 12, it is understood that, if the proportional factor of the AGC circuit is reduced, the level variation of the remaining signal light becomes larger. The reason why such a difference occurs is that, if the proportional factor is reduced, the speed for reducing the drive current for the pumping light source is dropped when the number of signal light wavelengths is reduced.

Accordingly, in order to avoid an influence on the remaining signal light even when the number of signal light wavelengths is abruptly changed, it becomes important that the optical power characteristic of the pumping light source can be monitored with high accuracy at the operation time of the optical amplifier, and the proportional factor of the AGC circuit can be corrected according to the monitoring result. However, in the conventional technique disclosed in each prior art references described above, it has been difficult to solve the above problems.

For the technique for monitoring the optical power characteristic of the pumping light source used in the optical amplifier, the present applicant has proposed a technique for changing the drive current for the pumping light source and measuring regularly the pumping light power supplied to an amplification medium, to detect a characteristic change in the pumping light source (refer to Japanese Unpublished Patent Application No. 2003-57951). However, even in this prior application, there still remains a problem as to how the drive current for the pumping light source is changed at the operation time of the optical amplifier. That is, in the case where the drive current for the pumping light source is changed at the operation time of the optical amplifier, there is a possibility that the amplification of the signal light in the operation is affected due to such a change in the drive current. Therefore, it is required to realize a specific monitoring method which avoids such a possibility.

SUMMARY OF THE INVENTION

The present invention has been accomplished in view of the above problems and has an object to realize a monitoring method capable of detecting with high accuracy an optical power characteristic of a pumping light source during the operation of an optical amplifier. Further, the invention has an object to provide an optical amplifier capable of controlling, using the monitoring method, a pumping light without substantially affecting a signal light in the operation even when the number of signal light wavelengths is abruptly changed.

In order to achieve the above objects, a characteristic monitoring method of a pumping light source for optical amplification according to the present invention, for monitoring an optical power characteristic of a pumping light source using a semiconductor laser, when a pumping light output from the pumping light source is supplied to a rare earth element doped fiber, to amplify a signal light, comprises: (1) modulating a drive signal for driving the pumping light source at a frequency higher than a cut-off frequency of the rare earth element doped fiber; (2) measuring the power of the pumping light output from the pumping light source driven by the modulated drive signal so as to correspond to a drive condition of the pumping light source; and (3) obtaining a slope of the optical power characteristic relative to a drive current for the pumping light source, based on the measurement result.

Further, an optical amplifier for supplying a pumping light output from a pumping light source using a semiconductor laser to a rare earth element doped fiber to amplify a signal light, comprises: a drive signal modulating section that modulates a drive signal for driving the pumping light source at a frequency higher than a cut-off frequency of the rare earth element doped fiber; a pumping light power measuring section that measures the power of the pumping light output from the pumping light source driven by the drive signal modulated by the drive signal modulating section, so as to correspond to a drive condition of the pumping light source; and a calculation processing section that obtains a slope of an optical power characteristic relative to a drive current for the pumping light source, based on the measurement result of the pumping light power measuring section.

In the optical amplifier of such a configuration as described above, the pumping light source is driven with the drive signal modulated at the frequency higher than the cut-off frequency of the rare earth element doped fiber, so that the power of the pumping light output from the pumping light source is varied according to a frequency modulation component. This variation of the pumping light power is measured so as to correspond to the drive condition of the pumping light source, and based on the measurement result, the slope of the optical power characteristic (I-L characteristic) relative to the drive current for the pumping light source can be obtained with high accuracy without affecting the signal light which is amplified by the rare earth element doped fiber.

Further, the optical amplifier described above may comprise: a pumping light control section that controls the drive condition of the pumping light source so that a gain of the signal light, which is amplified by the rare earth element doped fiber, is fixed; and a correcting section that corrects a proportional factor contained in a circuit constituting the pumping light control section, according to the slope of the optical power characteristic relative to the drive current for the pumping light source obtained by the calculation processing section.

In the optical amplifier of such a configuration as described above, since the proportional factor contained in the circuit constituting the pumping light control section is corrected according to the slope of the optical power characteristic relative to the drive current for the pumping light source obtained by the calculation processing section, then even in the case where the optical power characteristic of the pumping light source is changed due to a temperature change, the deterioration with time or the like, the drive condition of the pumping light source is controlled accurately by the pumping light control section.

The other objects, features and advantages of the present invention will be apparent from the following description of the embodiments with reference to the accompanying drawings.

DETAILED DESCRIPTION OF THE INVENTION

Figure 1:
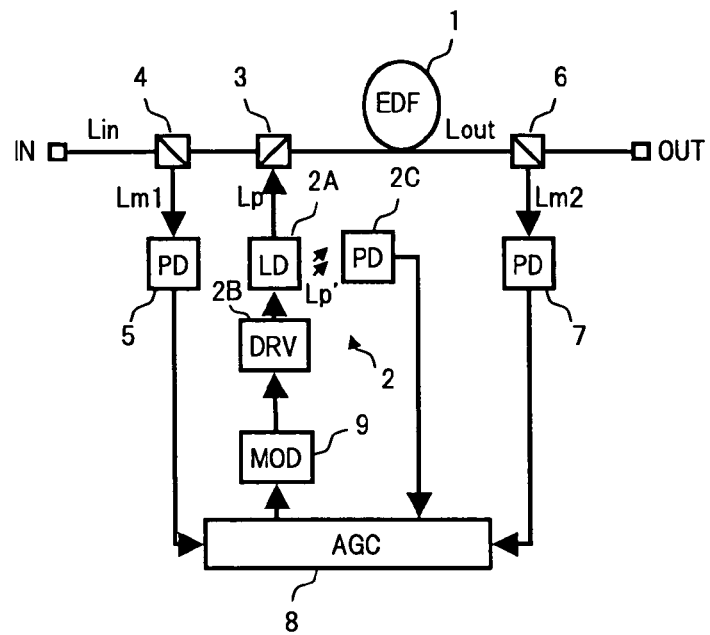
FIG. 1 is a block diagram showing one embodiment of an optical amplifier according to the present invention.

Hereinafter, embodiments for implementing a characteristic monitoring method of a pumping light source for optical amplification and an optical amplifier according to the present invention will be described with reference to drawings. Identical reference numerals denote identical or equivalent parts throughout all of the figures.

FIG. 1 is a block diagram showing one embodiment of the optical amplifier according to the present invention.

In FIG. 1, the present optical amplifier comprises: for example, an erbium doped fiber (EDF) 1 as a rare earth element doped fiber; a semiconductor laser module 2 consisting of a pumping light source 2A using a semiconductor laser (LD) and a drive circuit (DRV) 2B for driving the pumping light source 2A, and a light receiving element (PD) 2C as a pumping light power measuring section that monitors a backward emission light Lp' from the pumping light source 2A; and a multiplexer 3 supplying a pumping light Lp emitted from a front side of the pumping light source 2A. Further, the present optical amplifier comprises: a branching device 4 branching a part of a WDM light Lin, which is input from a signal light input end IN to the EDF 1 via the multiplexer 3, as an input monitor light Lm1; a light receiving element (PD) 5 converting the input monitor light Lm1 branched by the branching device 4 into an electric signal; a branching device 6 branching a part of a WDM light Lout, which is output from the EDF1, as an output monitor light Lm2; a light receiving element (PD) 7 converting the output monitor light Lm2 branched by the branching device 6 into an electric signal; an AGC circuit 8 receiving the electric signals from the respective light receiving elements 2C, 5 and 7; and a modulation circuit (MOD) 9 as a drive signal modulating section that modulates a drive control signal output from the AGC circuit 8 to the drive circuit 2B.

Figure 8:
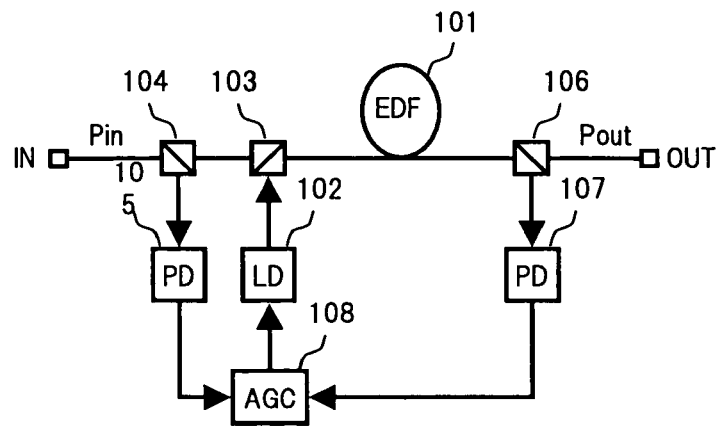
FIG. 8 is a block diagram showing one example of a conventional optical amplifier applied with an AGC.
Figure 9:
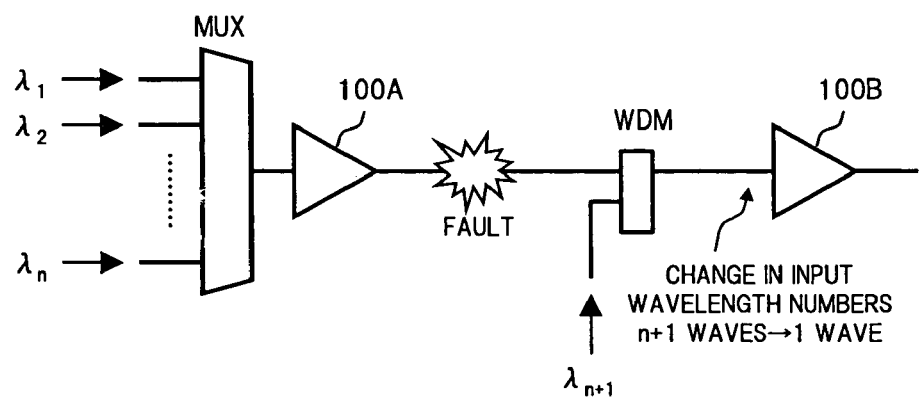
FIG. 9 is a diagram showing one example in which the conventional optical amplifier is applied to a system with adding/dropping of a signal light.

The configuration of the present optical amplifier differs from that of the conventional optical amplifier shown in FIG. 8 in that the drive control signal for controlling a drive condition of the pumping light source 2A is modulated at a frequency higher than a cut-off frequency of the EDF 1 by the modulation circuit 9, the output light power of the pumping light source 2A driven in accordance with the modulated drive control signal is monitored by the light receiving element 2C, and the monitoring result is fed back to the AGC circuit 8, so that a change in slope of an I-L characteristic of the pumping light source 2A is detected by the AGC circuit 8, and in accordance with the detection result, a proportional factor to be described later of the AGC circuit 8 is corrected.

In the present embodiment, as described later, the AGC circuit 8 comprises: a function as a pumping light control section; a function as a calculation processing section that obtains the slope of the I-L characteristic of the pumping light source 2A; and a function as a correcting section that corrects the proportional factor contained in the AGC circuit 8.

Figure 2:
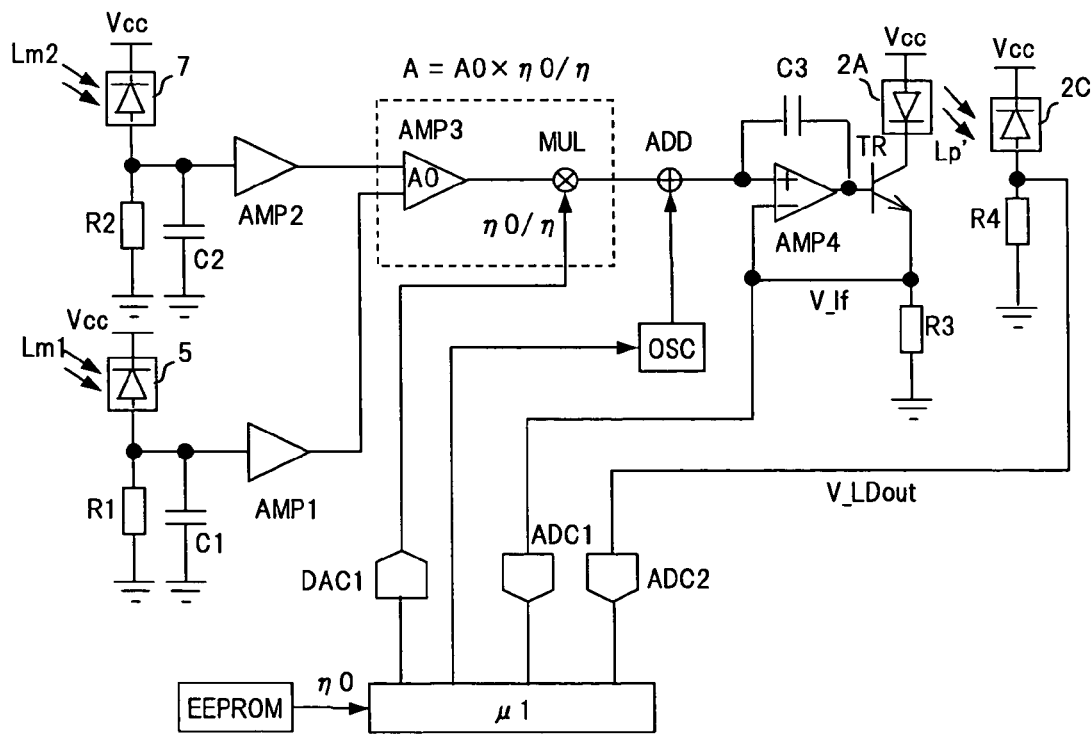
FIG. 2 is a circuit diagram showing a specific configuration example of a portion corresponding to a control circuit in FIG. 1.

FIG. 2 is a circuit diagram showing a specific configuration example of a portion corresponding to a control circuit of the optical amplifier shown in FIG. 1.

In the circuit configuration of FIG. 2, a photocurrent generated in the light receiving element 5, which received the input monitor light Lm1, is voltage transferred by a resistor R1, and thereafter impedance converted in an amplifier AMP1. Further, a photocurrent generated in the light receiving element 7, which received the output monitor light Lm2, is voltage transferred by a resistor R2, and thereafter impedance converted in an amplifier AMP2. Note, values of the respective resistors R1 and R2 or gains of the respective amplifiers AMP1 and AMP2 are set according to the gain setting of optical amplification in the EDF1, so that voltage levels of the respective amplifiers AMP1 and AMP2 to be input to a latter stage error amplifier AMP 3 are at the equivalent level.

The error amplifier AMP3 performs error amplification of respective output voltages from the amplifiers AMP1 and AMP2. A gain (proportional factor) A0 of this error amplifier AMP3 is set so as to correspond to a slope η0 of the I-L characteristic at a reference temperature (for example, 25° C.) in the beginning of life of the pumping light source 2A. An output signal from the error amplifier AMP3 is given to the drive circuit 2B via a multiplier MUL and an adder ADD.

The drive circuit 2B is a typical drive circuit, which receives the output signal from the error amplifier AMP3 at a base terminal of a transistor TR thereof via a differential amplifier AMP4, to control the drive current to be supplied to the pumping light source 2A. Note, the drive current If to be supplied to the pumping light source 2A is voltage converted by a resistor 3 connected between an emitter terminal of the transistor TR and an earth terminal, and the converted voltage signal V_If is set to a reference voltage of the differential amplifier AMP4, and at the same time, sent to a micro-controller μ1 via an A/D converter ADC1.

A photocurrent generated in the light receiving element 2C, which received the backward emission light Lp' from the pumping light source 2A, is voltage converted by a resistor 4 into V_LDout, and this voltage signal V_LDout is sent to the micro-controller μ1 via an A/D converter ADC2. Note, it is desirable that a band of the circuit for monitoring the voltage signal V_LDout, and a band of the circuit for monitoring the voltage signal V_If are set, respectively, to be ten times or above a band of the drive circuit 2B including the differential amplifier AMP4.

Figure 3:
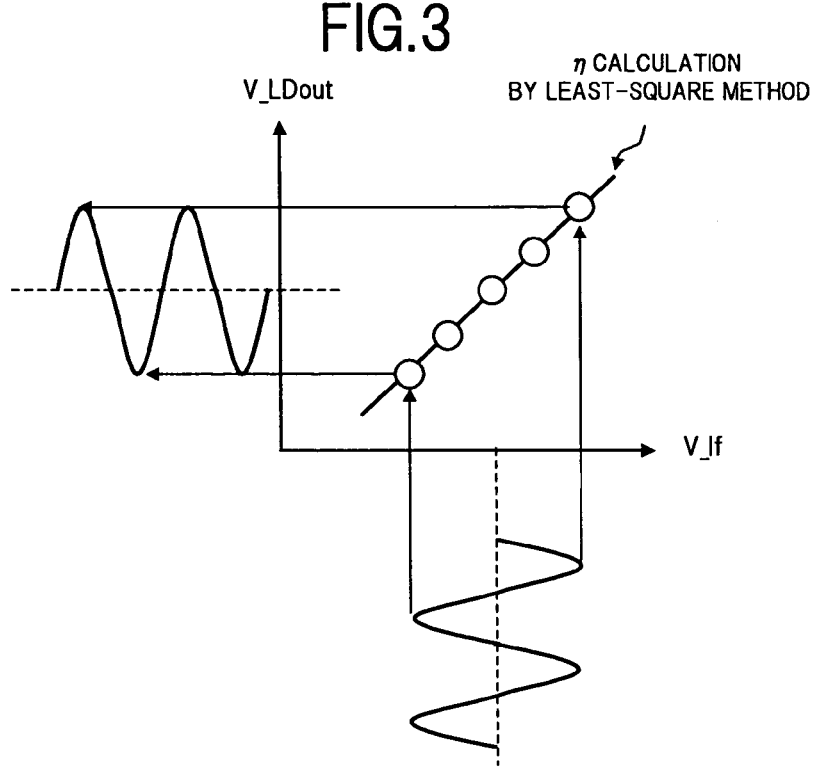
FIG. 3 is a schematic diagram for explaining a method of calculating a slope of an I-L characteristic of a pumping light source in the above embodiment.

The micro-controller μ1 takes therein output signals from the A/D converters ADC1 and ADC2, to calculate the slope η of the I-L characteristic of the pumping light source 2A using the least square, based on the relationship of the voltage signal V_LDout to the voltage signal V_If, as shown in a schematic diagram of FIG. 3, for example. The micro-controller μ1 is given with a reference value η0 (the slope of the I-L characteristic at the reference temperature in the beginning of life of the pumping light source 2A), stored in a memory, such as an EEPROM or the like, to operate a D/A converter DAC1 based on the slope η of the I-L characteristic of the pumping light source 2A, which is calculated at the operation time, and the reference value η0, so that a coefficient of the multiplier MUL disposed between the error amplifier AMP3 and the differential amplifier AMP4, reaches η0/η. The micro-controller μ1 also output a signal for controlling an operation of an oscillator OSC.

The oscillator OSC generates a minute AC signal with the amplitude ΔV and a frequency f in accordance with the control signal from the micro-controller μ1, to output it to the adder ADD disposed between the error amplifier AMP3 and the differential amplifier AMP4. In the adder ADD, the AC signal from the oscillator OSC is superimposed on the output signal from the error amplifier AMP3. Here, the modulation circuit 9 in FIG. 1 is configured with the oscillator OSC and the adder ADD. Note, the specific setting of the amplitude ΔV and the frequency f of the AC signal will be described later.

Next, an operation of the present embodiment will be described.

First, a characteristic monitoring method for the pumping light source 2A, which is implemented in the optical amplifier of the above configuration, will be described. In the present optical amplifier, in order to monitor the I-L characteristic of the pumping light source 2A without affecting a signal light to be amplified by the EDF1 at the operation time, the drive control signal output from the AGC circuit 8 to the drive circuit 2B is modulated at the frequency higher than the cut-off frequency of the EDF1, by the modulation circuit 9. To be specific, in the adder ADD, the AC signal with the amplitude ΔV and the frequency f generated in the oscillator OSC is superimposed on the voltage signal which is output from the error amplifier AMP3 to be sent to the differential amplifier AMP4, so that the modulation of the drive current to be supplied to the pumping light source 2A is performed. The frequency f of the AC signal is set to be higher than the cut-off frequency of the EDF1.

Figure 4:
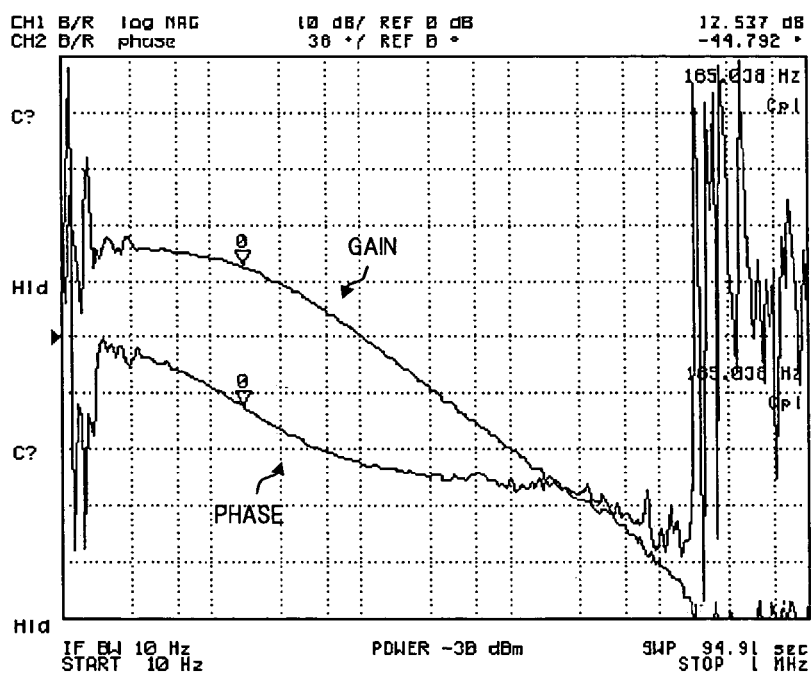
FIG. 4 is a diagram showing one example of a frequency response of a signal light to a pumping light in an EDF.

A frequency response of the signal light to the pumping light in the EDF1 is a first-order lag element as shown in FIG. 4, for example, and largely depends on the optical output power. The cut-off frequency of the signal light is several tens Hz to several kHz. Accordingly, several MHz sufficiently higher than the cut-off frequency of the EDF1 is set as the frequency f of the AC signal, so that an influence on the signal light by modulating the drive current of the pumping light source 2A with an AC signal component, becomes about 1/1000 times of the signal light amplitude at the time of cut-off frequency. As a result, even if about ten and several mA, which is enough to calculate the slope η of the I-L characteristic of the pumping light source 2A by the micro-controller μ1, is set as the amplitude ΔV of the AC signal, there does not occur the AC signal component in the signal light to be amplified in the EDF1, as a noise.

Figure 5:
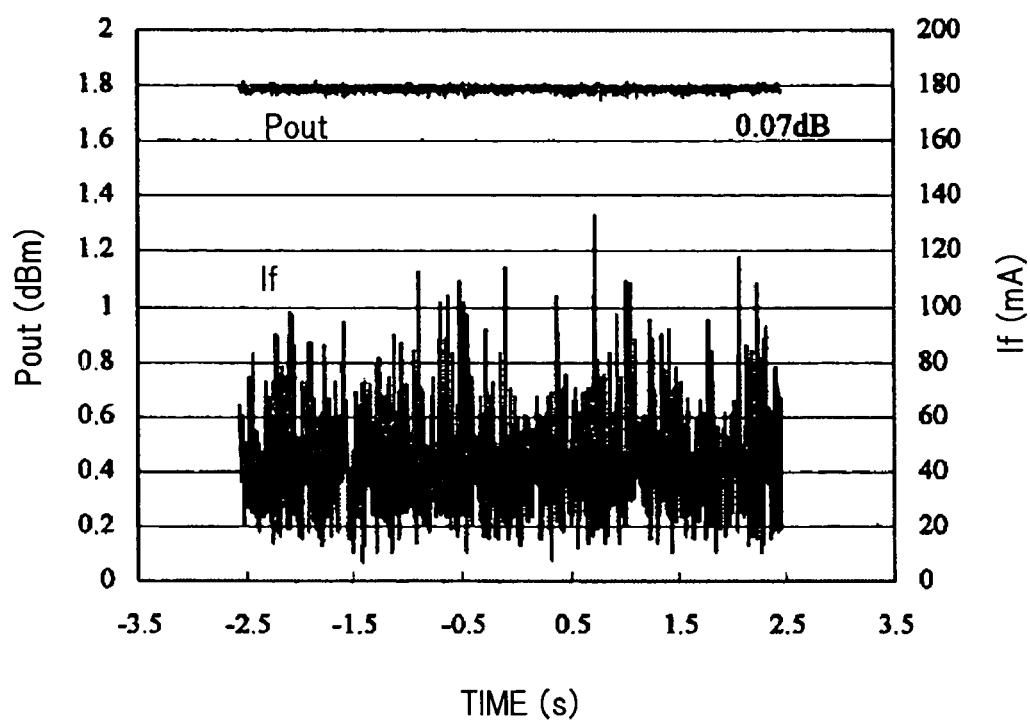
FIG. 5 is experimental data showing temporary variations of a drive current for the pumping light source and the signal light power in the above embodiment.
Figure 6:
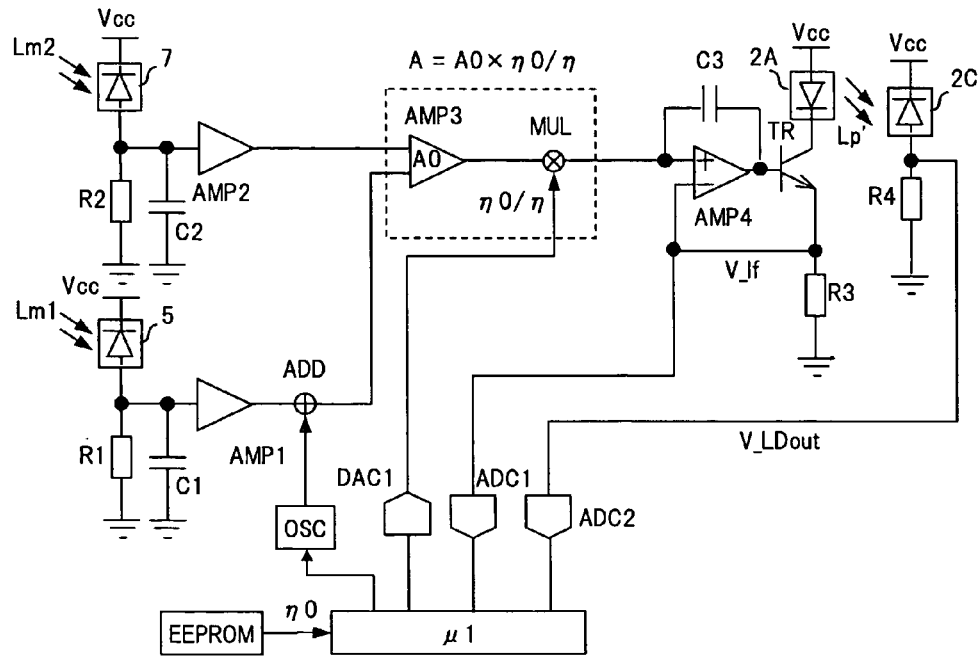
FIG. 6 is a block diagram showing a modified example related to the above embodiment.

As one example, in the case where the drive current for the pumping light source 2A is modulated at the center value of about 60 mA, the amplitude of about 50 mA and the frequency of 2 MHz, the AC component does not occur in the signal light as a noise, thereby enabling the calculation of the slope η. FIG. 5 shows experimental data showing temporary variations of the drive current (If) for the pumping light source 2A and the signal light power (Pout) in the case where the pumping light source 2A is modulated as described above, and shows that a variation amount of the signal light power at this time was about 0.07 dB.

As described in the above, the pumping light source 2A is driven by the drive current modulated at the frequency higher than the cut-off frequency of the EDF1, so that the powers of the pumping lights Lp and Lp' emitted from the front and back sides of the pumping light source 2A are varied according to the AC signal component. Therefore, the power variation of the backward emission light Lp' is monitored by the light receiving element 2C, and using the relationship between the voltage signal V_LDout indicating the monitoring result and the voltage signal V_If obtained by monitoring the variation of the drive current, the slope η of the I-L characteristic of the pumping light source 2A can be calculated by performing approximation processing, such as the least square or the like, without affecting the signal light to be amplified by the EDF1 (refer to FIG. 3). The thus calculated slope η of the I-L characteristic of the pumping light source 2A can be ensured with the higher accuracy compared with the case where the I-L characteristic is predicted based on a certain operating point, since there is no influence of the deterioration or kink of oscillation threshold of the pumping light source 2A.

Then, in the present optical amplifier, the proportional factor of the AGC circuit 8 is corrected using the slope η of the I-L characteristic of the pumping light source 2A, which has been monitored at the operation time as described above. Specifically, this correction of the proportional factor is realized by controlling the coefficient of the multiplier MUL to η0/η, using η calculated by the micro-controller μ1 and the reference value η0 stored in the memory. Namely, since the relationship of A=A0×η0/η is established for a proportional coefficient (gain) A of the circuit including the error amplifier AMP3 and the multiplier MUL, even in the case where the slope of the I-L characteristic of the pumping light source 2A is changed due to the temperature change, the deterioration with time or the like, the proportional factor of the entire AGC circuit 8 is always maintained constant. Note, a cycle of the above proportional factor correction may be set, for example, about one time per several hundreds ms, so as not to overlap with a time constant of the AGC. A speed of the temperature change or the deterioration with time of the pumping light source 2A is far slow compared with the above cycle, and therefore, it is possible to perform a sufficiently effective correction in such cycle setting.

Figure 10:
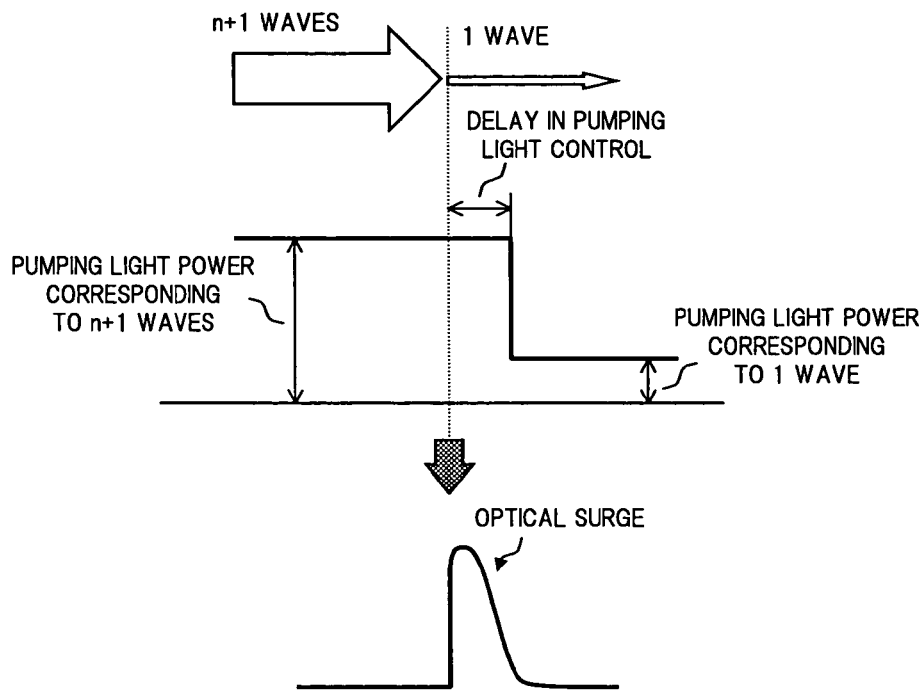
FIG. 10 is a diagram for explaining a state where an optical surge occurs for when the number of signal light wavelengths is abruptly changed in the system of FIG. 9.
Figure 11:
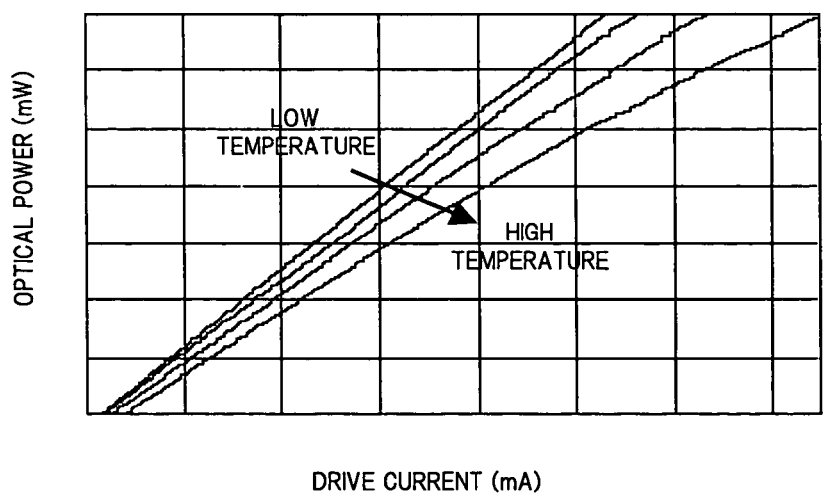
FIG. 11 is a diagram showing a state where a slope of an I-L characteristic of a semiconductor laser is changed depending on a temperature.
Figure 12:
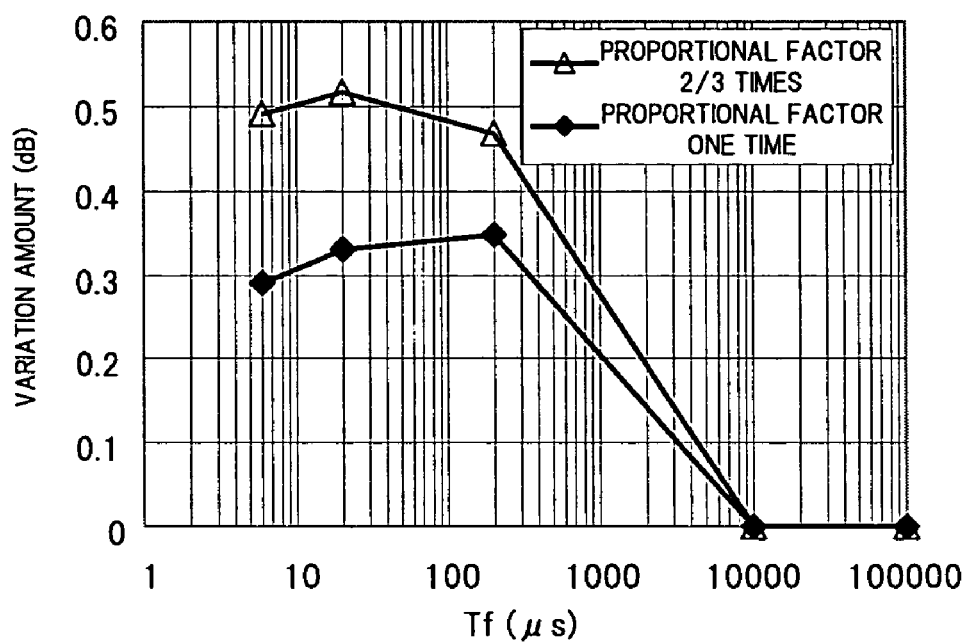
FIG. 12 is a diagram showing a level variation of a remaining signal light, which occurs for when the number of signal light wavelengths is changed, so as to correspond to a proportional factor of an AGC circuit.

As a result, for example, even in the case where a cooler-less semiconductor laser is used as the pumping light source 2A, so that the I-L characteristic is significantly changed due to the temperature change, or even in a situation where the number of signal light wavelengths to be amplified by the EDF1 is abruptly changed, following such a change, the power of the pumping light Lp can be switched at a high speed and with accuracy by the AGC circuit 8. Thus, it becomes possible to effectively suppress an occurrence of optical surge as shown in FIG. 10.

Figure 7:
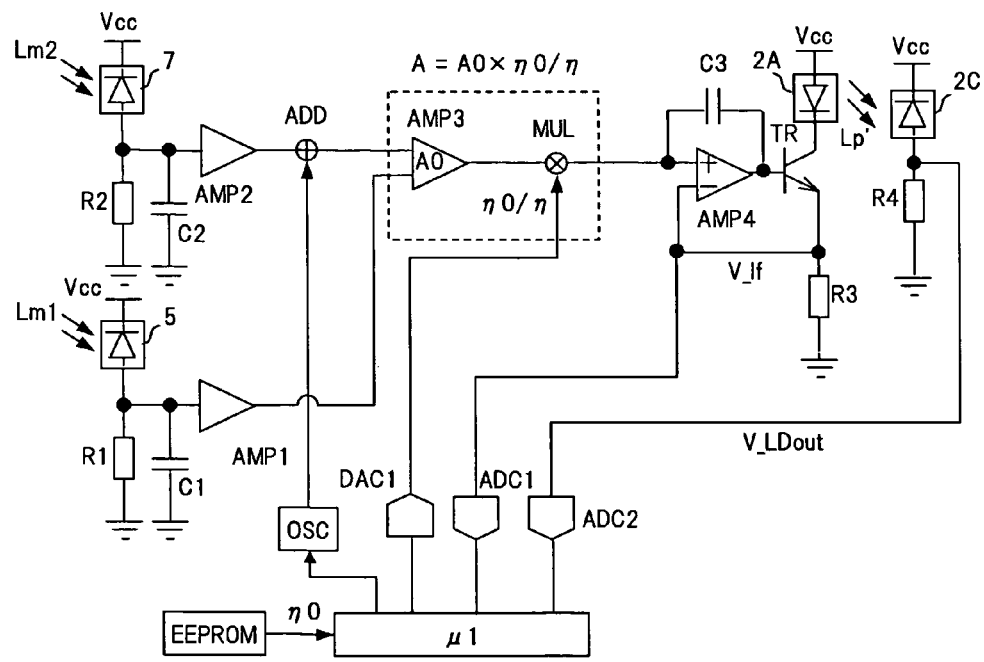
FIG. 7 is a block diagram showing another modified example related to the above embodiment.

In the above embodiment, the description has been made on the configuration where the AC signal generated in the oscillator OSC is superimposed on the drive control signal by the adder ADD, which is disposed between the error amplifier AMP3 and the differential amplifier AMP4. However, the arrangement of the adder ADD (a position at which the AC signal is superimposed on the drive control signal) is not limited to the above, and it is possible that the adder ADD is disposed between the amplifier AMP1 in an input side monitoring system and the error amplifier AMP3, or for example as shown in FIG. 7, between the amplifier AMP2 in an output side monitoring system and the error amplifier AMP3, to superimpose the AC signal on the drive control signal.

Further, in the case where the signal light to be input to the optical amplifier contains, from the beginning, a frequency component of several MHz (for example, a frequency component generated by information of a header portion of transmission data), since the output of the error amplifier AMP3 contains the above frequency component, it is also possible to omit the oscillator OSC and the adder ADD. In this case, in order to adjust the amplitude of the frequency component of several MHz, in the circuit configuration in FIG. 2, for example, capacities or the like of capacitors C1 and C2 disposed in the respective monitoring systems on the input and output sides may be adjusted, to make a band difference between the respective monitoring systems. By appropriately setting the amplitude of the frequency component of several MHz in such a manner, it becomes possible to monitor the characteristic of the pumping light source 2A and to correct the proportional factor of the AGC circuit 8, similarly to the above embodiment.

Further, in the above embodiment, the optical output power of the pumping light source 2A has been monitored utilizing the backward emission light Lp'. However, the present invention is not limited thereto, and the configuration may be such that a part of the pumping light Lp, which is emitted from the front side of the pumping light source 2A to be sent to the EDF1, is branched, and the power of the branched light is monitored.

In addition, there has been shown the example in which the AGC circuit 8 is configured using a micro-controller μ1. However, the AGC circuit 8 may be configured using an analog circuit. Moreover, the circuit configuration of the AGC circuit 8 has been of a feedback type in which the pumping light source 2A is driven according to the errors of the input monitor light Lm1 and the output monitor light Lm2 as shown in FIG. 2. However, for example, it is also possible to make the circuit configuration of the AGC circuit 8 to be of a feedforward type in which the pumping light source 2A is driven according to the input monitor light Lm1 only. Also, in this case, the proportional coefficient A of the feedforward may be corrected with A=A0×η0/η.

Furthermore, the erbium doped fiber has been adopted as an amplification medium of the optical amplifier, however, it is surely possible to use an optical fiber doped with a rare earth element other than erbium, as the amplification medium.

What is claimed is:

1. A characteristic monitoring method of a pumping light source for optical amplification, for monitoring an optical power characteristic of a pumping light source using a semiconductor laser, when a pumping light output from said pumping light source is supplied to a rare earth element doped fiber, to amplify a signal light, comprising:

modulating a drive signal for driving said pumping light source at a frequency higher than a cut-off frequency of said rare earth element doped fiber;

measuring the power of the pumping light output from said pumping light source driven by said modulated drive signal so as to correspond to a drive condition of said pumping light source; and obtaining a slope of the optical power characteristic relative to a drive current for said pumping light source, based on the measurement result.

2. An optical amplifier for supplying a pumping light output from a pumping light source using a semiconductor laser to a rare earth element doped fiber to amplify a signal light, comprising:

a drive signal modulating section that modulates a drive signal for driving said pumping light source at a frequency higher than a cut-off frequency of said rare earth element doped fiber;

a pumping light power measuring section that measures the power of the pumping light output from said pumping light source driven by the drive signal modulated by said drive signal modulating section so as to correspond to a drive condition of said pumping light source; and a calculation processing section that obtains a slope of an optical power characteristic relative to a drive current for said pumping light source, based on the measurement result of said pumping light power measuring section.

3. An optical amplifier according to claim 2, further comprising:
  a pumping light control section that controls the drive condition of said pumping light source so that a gain of the signal light, which is amplified by said rare earth element doped fiber, is fixed; and
  a correcting section that corrects a proportional factor contained in a circuit constituting said pumping light control section, according to the slope of the optical power characteristic relative to the drive current for said pumping light source obtained by said calculation processing section.

4. An optical amplifier according to claim 3,
  wherein said pumping light control section includes: an input side monitoring system monitoring the power of the signal light input to said rare earth element doped fiber; an output side monitoring system monitoring the power of the signal light output from said rare earth element doped fiber; and a control circuit comparing between the respective signal light powers monitored by said input side monitoring system and said output side monitoring system, to generate a drive control signal for controlling the drive condition of said pumping light source, and
  said drive signal modulating section modulates any one of a signal indicating the monitoring result of said input side monitoring system, a signal indicating the monitoring result of said output side monitoring system and said drive control signal at the frequency higher than the cut-off frequency of said rare earth element doped fiber.

5. An optical amplifier according to claim 4,
  wherein the proportional factor contained in a circuit constituting said pumping light control section, is a gain of an error amplifier to which the signal indicating the monitoring result of said input side monitoring system and the signal indicating the monitoring result of said output side monitoring system are input.

6. An optical amplifier according to claim 5,
  wherein, when the slope of the optical power characteristic relative to the drive current at a reference temperature in the beginning of life of said pumping light source is $\eta 0$, the gain of said error amplifier is set so as to correspond to said $\eta 0$, and
  when the slope of the optical power characteristic relative to the drive current of said pumping light source obtained by said calculation processing section is $\eta$, said correcting section performs a correction so that the gain of said error amplifier reaches $\eta 0/\eta$ times.

7. An optical amplifier according to claim 2,
  wherein said drive signal modulating section includes: an oscillator generating an AC signal having a frequency higher than the cut-off frequency of said rare earth element doped fiber; and an adder superimposing the AC signal output from said oscillator on said drive signal.

* * * * *